May 13, 1924.
W. A. DARRAH
FLUID MEASURING APPARATUS
Filed March 14, 1921
1,493,610
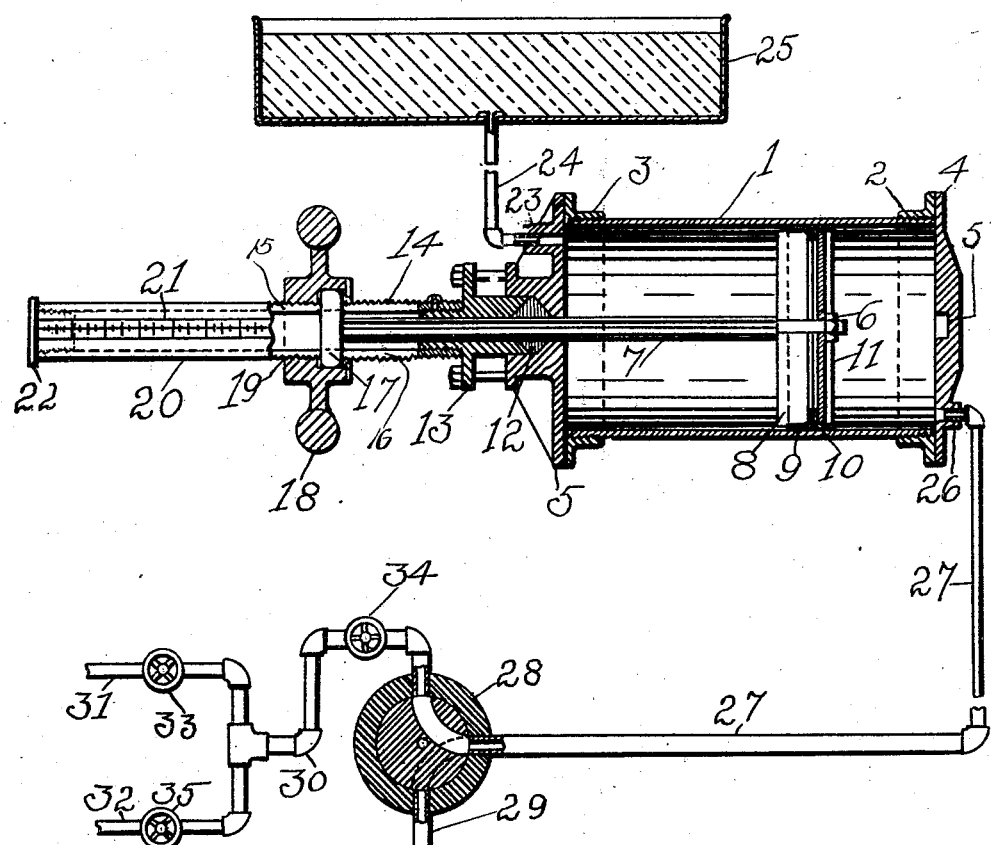
*Figure I*
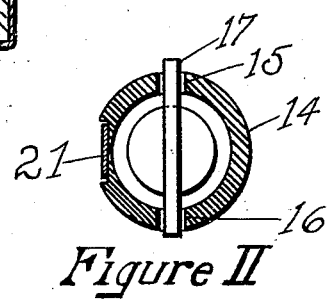
*Figure II*
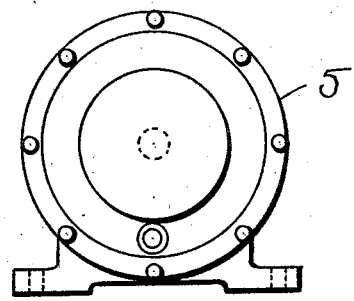
*Figure III*
Inventor:
William A. Darrah.

Patented May 13, 1924.

1,493,610

UNITED STATES PATENT OFFICE.

WILLIAM A. DARRAH, OF CHICAGO, ILLINOIS, ASSIGNOR TO THE EKCO ENGINEERING COMPANY, OF CHICAGO, ILLINOIS.

FLUID-MEASURING APPARATUS.

Application filed March 14, 1921. Serial No. 452,219.

*To all whom it may concern:*

Be it known that I, WILLIAM A. DARRAH, a citizen of the United States, residing at Chicago, in the county of Cook and State of Illinois, have invented a new and useful Improvement in Fluid-Measuring Apparatus, of which the following is the specification.

This invention relates to apparatus for measuring fluids, and is particularly intended for various industrial operations wherein a given amount of fluid must be accurately measured in a minimum period of time and with a high degree of accuracy. One application to which this apparatus is particularly suited is the measuring of water used in connection with the mixing of dough for bread, cake, pastry, etc. It will, of course, be obvious that this equipment may be used for the measurement of any other fluid, such as oil, gasoline, etc.

The object of this invention is to provide a simple, effective and durable equipment for accurately measuring pre-determined volumes of liquid in a manner which will require no skill on the part of the operator, thus permitting the use of relatively low priced labor while securing highly accurate results. Another advantage of this equipment is the ease and rapidity with which a large number of repeated measurements can be made in industrial processes.

Referring to the drawing, Fig. 1 shows a side elevation partly in section of one form of this apparatus. Fig. 2 shows a section through the calibrated measuring tube, while Fig. 3 shows an end elevation of the equipment.

Referring to Fig. 1, 1 represents a cylindrical shell which may well be made of seamless tubing or iron piping. End castings 2 and 3 are secured on to shell 1 and fastened by bolts to castings 4 and 5 respectively which close the end of the cylinder. Casting 4 is provided with recess 5 to allow clearance for the nut 6 which fastens piston rod 7 to piston 8; cup leathers 9 and 10 serve to keep piston 8 tight in cylinder 1, while washer 11 serves to hold cup leather 10 in position. Packing 12 in recess of the casting 5 is held in position by stuffing box casting 13 and serves to prevent leakage around piston rod 7. A seamless tube 14 is adjustably fastened upon casting 13 and surrounds piston rod 7 as it travels outward. The said seamless tube 14 is slotted at points 15 and 16 and a shim member is inserted in said slots.

Stop member 17 is held in a predetermined position by hand wheel 18 which is threaded in its inner bore 19 to cooperate with the threads 20 of tube 14. Scale 21 is inserted in a depression of tube 14 and carries calibrations indicating the amount of fluid held in the cylinder behind the piston. A plug 22 may be used to close the end of tube 14 and control the outward movement of hand wheel 18.

Casting 5 is provided with an outlet 23 which is connected by pipe 24 to tank 25 which is preferably located at some appreciable elevation above the cylinder 1 as, for example, upon the roof of a building, although a lesser elevation may be used.

Casting 4 is provided with outlet 26 which is connected by pipe 27 to a two-way valve. One post of said valve is connected to pipe 29, conveying the liquid to the dough mixer or to any other desired point at which the liquid is to be employed. Pipe 30 connects two-way valve 28 with the original source of the liquid and may be, in the case of dough mixers, connected to a source of hot and cold water, represented by pipes 31 and 32 respectively. 33, 34 and 35 indicate control valves which may be convenient in regulating the temperature of the water employed.

In operating the device, two-way valve 28 is placed in such a position that the fluid from incoming pipe 30 is connected to pipe 27, thus filling the space back of piston 8; as the fluid flows into cylinder 1, it forces piston 8 forward until piston rod 7 strikes stop 17 which is held in position by hand wheel 18. At this point, no further movement is possible and the two-way valve 28 is then turned into the dotted position which serves to connect pipe 27 with outlet 29. In this position, the fluid in cylinder 1 is free to pass through two-way valve 28 into any desired receptacle.

In order to insure that the fluid in cylinder 1 will move as desired, tank 25 previously described supplies a sufficient head to force piston 8 backward toward the end of the cylinder, thus expelling the water.

It will be evident that the scale referred to above may be calibrated in pounds, gallons or any other desired unit. It will also be obvious that different settings of the hand wheels will allow different quantities of liquid to enter cylinder 1 and since all of the liquid which enters cylinder 1 must be expelled, it will be apparent that extreme accuracy will result without any care or attention in operation.

It will also be apparent that many modifications of the construction described will be possible without departing from the spirit of this invention. For example, instead of using a storage tank 25 to supply force to return piston 8, a compressed air tank may be used and coiled spring may be placed back of piston 8, or various other alternatives. It will also be evident that the device may be made "double acting", that is, each side of the piston may be employed as a measuring means without departing from the spirit of this invention.

By adjusting the position of the tube 14 carrying graduated scale, compensation may be made for variation in manufacturing dimensions, also, by adjusting the locations of scale 21 on the tube 14, some compensation is provided.

Having now fully described my invention, what I claim as new and wish to cover by Letters Patent in the United States is as follows:—

A fluid measuring device consisting of a cylinder, a piston reciprocating therein, a piston rod having a controlled calibrated travel, and fluid inlets at each end of the cylinder, means for admitting the fluid to be measured, at one end of the cylinder, and means for holding under pressure the fluid expelled at the other end of the cylinder.

WILLIAM A. DARRAH.